US010811643B2

(12) United States Patent
Guo et al.

(10) Patent No.: US 10,811,643 B2
(45) Date of Patent: Oct. 20, 2020

(54) BATTERY CAP ASSEMBLY, SECONDARY BATTERY AND BATTERY MODULE

(71) Applicant: CONTEMPORARY AMPEREX TECHNOLOGY CO., LIMITED, Ningde (CN)

(72) Inventors: Zhijun Guo, Ningde (CN); Jie Zhang, Ningde (CN); Taosheng Zhu, Ningde (CN); Peng Wang, Ningde (CN); Guowei Li, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 163 days.

(21) Appl. No.: 15/969,652

(22) Filed: May 2, 2018

(65) Prior Publication Data

US 2019/0214612 A1 Jul. 11, 2019

(30) Foreign Application Priority Data

Jan. 11, 2018 (CN) .......................... 2018 1 0025795

(51) Int. Cl.
*H01M 2/04* (2006.01)
*H01M 2/06* (2006.01)
(Continued)

(52) U.S. Cl.
CPC .............. *H01M 2/04* (2013.01); *H01M 2/06* (2013.01); *H01M 2/202* (2013.01); *H01M 2/30* (2013.01);
(Continued)

(58) Field of Classification Search
CPC .......... H01M 2/04; H01M 2/06; H01M 2/202; H01M 2/30; H01M 10/02; H01M 2004/027; H01M 2004/028
(Continued)

(56) References Cited

U.S. PATENT DOCUMENTS

2005/0095502 A1* 5/2005 Sugimune ............... H01M 2/06
429/180
2009/0169990 A1* 7/2009 Gardner .................. H01M 2/30
429/179
(Continued)

FOREIGN PATENT DOCUMENTS

| CN | 102034954 B | 1/2014 |
| CN | 102110798 B | 4/2015 |
| EP | 2312675 A1 | 4/2011 |

OTHER PUBLICATIONS

Contemporary Amperex Technology Co. Limited, Extended European Search Report, EP18172071.5, dated Jun. 29, 2018, 7 pgs.

*Primary Examiner* — James M Erwin
(74) *Attorney, Agent, or Firm* — Morgan, Lewis & Bockius LLP

(57) ABSTRACT

The present disclosure provides a battery cap assembly, a secondary battery and a battery module. The battery cap assembly comprises a cap plate, a first electrode terminal and a first sealing member. The cap plate includes a first terminal hole. The first electrode terminal includes a first protruding portion and a first base portion, a cross-sectional area of the first protruding portion is larger than a cross-sectional area of the first terminal hole. The first sealing member includes a first main portion, the first main portion includes a first through-hole. The first protruding portion is used for welding with a first connecting piece to form a welding portion, a projection of the welding portion is positioned in the first through-hole. The secondary battery comprises a case, the battery cap assembly and an electrode assembly. The battery module comprises the first connecting piece and the secondary batteries.

11 Claims, 7 Drawing Sheets

(51) Int. Cl.
*H01M 10/02* (2006.01)
*H01M 2/30* (2006.01)
*H01M 2/20* (2006.01)
*H01M 4/02* (2006.01)

(52) U.S. Cl.
CPC ...... *H01M 10/02* (2013.01); *H01M 2004/027* (2013.01); *H01M 2004/028* (2013.01)

(58) Field of Classification Search
USPC .......................................................... 429/175
See application file for complete search history.

(56) References Cited

U.S. PATENT DOCUMENTS

| | | | |
|---|---|---|---|
| 2011/0052970 A1* | 3/2011 | Kurata | H01M 2/0404 429/158 |
| 2011/0081572 A1* | 4/2011 | Byun | H01M 2/26 429/178 |
| 2014/0308568 A1 | 10/2014 | Kim | |
| 2014/0377625 A1* | 12/2014 | Tsutsumi | H01M 2/206 429/121 |
| 2015/0086834 A1* | 3/2015 | Cho | H01M 2/206 429/121 |
| 2017/0229700 A1* | 8/2017 | Matsumoto | H01M 2/20 |

\* cited by examiner

BATTERY CAP ASSEMBLY, SECONDARY BATTERY AND BATTERY MODULE

CROSS-REFERENCE To RELATED APPLICATIONS

The present application claims priority to Chinese patent application No. CN201810025795.X, filed on Jan. 11, 2018, which is incorporated herein by reference in its entirety.

FIELD OF THE PRESENT DISCLOSURE

The present disclosure relates to the field of battery, and particularly relates to a battery cap assembly, a secondary battery and a battery module.

BACKGROUND OF THE PRESENT DISCLOSURE

At present, the secondary batteries of the battery module are generally connected by connecting pieces, and in the prior art, the connecting piece is generally fixed to an electrode terminal in a cap plate of the secondary battery by laser penetration welding. In order to be connected with an electrode assembly in the secondary battery, the electrode terminal needs to pass through the cap plate; and in order to ensure the sealing performance of the secondary battery, a sealing member is required to provide between the electrode terminal and the cap plate. If the sealing member is provided to an inner side of the cap plate (in other words, the sealing member is provided inside the secondary battery), the sealing member will be easily corroded by an electrolyte, which affects the sealing performance of the sealing member. The sealing member also can be provided to an outer side of the cap plate in the prior art, however, a welding zone formed in the process of welding the connecting piece is generally in the shape of stripe, in order to increase an overcurrent area, the welding zone will cover the sealing member from above, and the heat generated in the process of welding will be directly transferred downwardly to the sealing member via the electrode terminal, which leads to the sealing member aging by high temperature and in turn leads to the sealing member being failed.

SUMMARY OF THE PRESENT DISCLOSURE

In view of the problem existing in the background, an object of the present disclosure is to provide a battery cap assembly, a secondary battery and a battery module, which can prevent the sealing member being damaged by high temperature in the process of assembling, and improving sealing performance and safety performance.

In order to achieve the above object, in a first aspect, the present disclosure provides a battery cap assembly, which comprises a cap plate, a first electrode terminal and a first sealing member. The cap plate includes a first terminal hole. The first electrode terminal includes a first protruding portion protruding above the cap plate and a first base portion connected with the first protruding portion, the first base portion extends into the first terminal hole, a cross-sectional area of the first protruding portion is larger than a cross-sectional area of the first terminal hole. The first sealing member includes a first main portion provided between the first protruding portion and the cap plate, the first main portion includes a first through-hole through which the first base portion passes. The first protruding portion of the first electrode terminal is used for welding with a first connecting piece to form a welding portion, and a projection of the welding portion in an up-down direction is positioned in the first through-hole of the first main portion. In an embodiment, the first base portion is connected with a bottom surface of the first protruding portion and extends downwardly.

In order to achieve the above object, in a second aspect, the present disclosure provides a secondary battery, which comprises a case, the battery cap assembly according to the first aspect of the present disclosure and an electrode assembly. The case has an opening in a top thereof. The battery cap assembly is fixed to the case and seals the opening of the case. The electrode assembly is received in the case and electrically connected with the first electrode terminal.

In order to achieve the above object, in a third aspect, the present disclosure provides a battery module, which comprises the first connecting piece and the secondary batteries according to the second aspect of the present disclosure, the first connecting piece is welded with the first protruding portion of the first electrode terminal of the battery cap assembly of the secondary battery to form the welding portion.

The present disclosure has the following beneficial effects: in the process of assembling the battery module according to the present disclosure, the welding portion is formed by welding the first protruding portion of the first electrode terminal of the battery cap assembly of the secondary battery and the first connecting piece, and the projection of the welding portion in the up-down direction is positioned in the first through-hole of the first main portion of the first sealing member. The heat generated in the process of welding is firstly transferred to a part of the first protruding portion positioned above the first main portion and then transferred downwardly to the first main portion, rather than directly transferred downwardly to the first main portion, therefore, the battery module of the present disclosure can increase heat transfer path in the process of welding, decrease heat transferred to first main portion, reduce risk that the first main portion of the first sealing member is damaged by high temperature, improve sealing performance and safety performance of the battery cap assembly, the secondary battery and the battery module.

Figure 1:
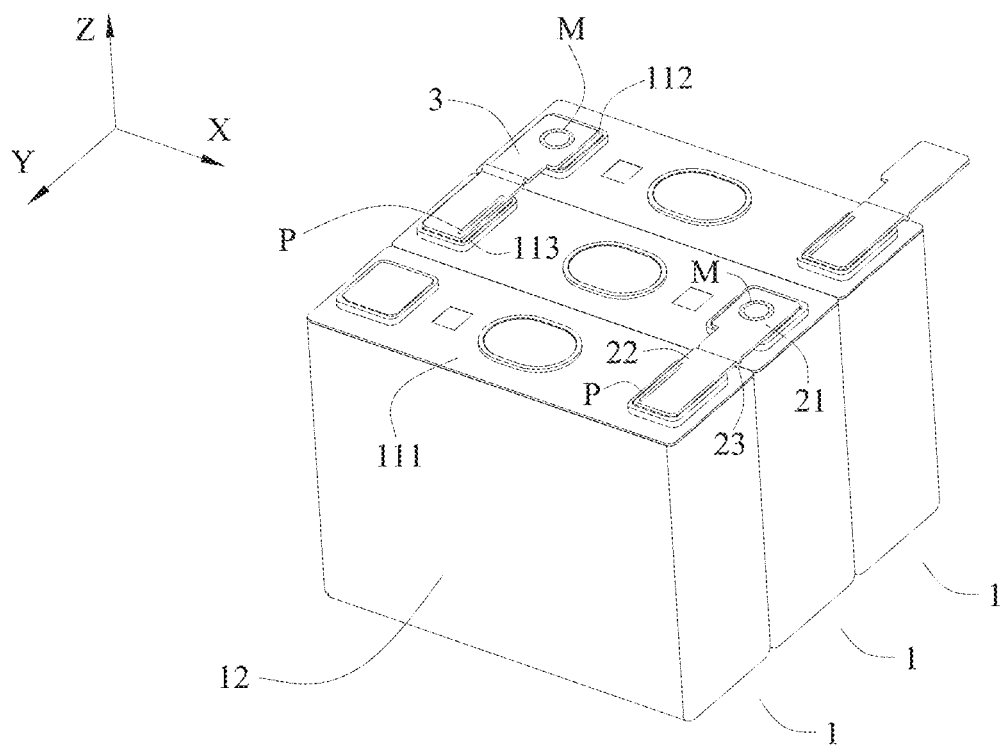
FIG. 1 is a schematic view of an embodiment of a battery module according to the present disclosure.

Reference numerals in figures are represented as follows:
1 secondary battery
  11 battery cap assembly
    111 cap plate
      1111 first terminal hole
      1112 second terminal hole
    112 first electrode terminal
      1121 first protruding portion
      1122 first base portion
    113 second electrode terminal
      1131 second protruding portion
      1132 second base portion
    114 first sealing member
      1141 first main portion
      1142 first extending portion
    115 second sealing member
      1151 second main portion
      1152 second extending portion
    116 adapter piece
  12 case
  13 electrode assembly
2 first connecting piece
  21 first connecting portion
  22 second connecting portion
    221 third through-hole
  23 third connecting portion
3 second connecting piece
M welding portion
P protrusion
S upper surface
H1 first through-hole
H2 second through-hole
X transverse direction
Y longitudinal direction
Z up-down direction

DETAILED DESCRIPTION

Hereinafter a battery cap assembly, a secondary battery and a battery module according to the present disclosure will be described in detail in combination with the figures.

Firstly, a battery cap assembly according to a first aspect of the present disclosure will be described.

Referring to FIGS. 1-14, a battery cap assembly 11 according to the present disclosure comprises a cap plate 111, a first electrode terminal 112 and a first sealing member 114. The cap plate 111 includes a first terminal hole 1111. The first electrode terminal 112 includes a first protruding portion 1121 protruding above the cap plate 111 and a first base portion 1122 connected with a bottom surface of the first protruding portion 1121, the first base portion 1122 extends downwardly and extends into the first terminal hole 1111, a cross-sectional area of the first protruding portion 1121 is larger than a cross-sectional area of the first terminal hole 1111. The first sealing member 114 includes a first main portion 1141 provided between the first protruding portion 1121 and the cap plate 111, the first main portion 1141 includes a first through-hole H1 through which the first base portion 1122 passes. The first protruding portion 1121 of the first electrode terminal 112 is used for welding with a first connecting piece 2 to form a welding portion M, and a projection of the welding portion M in an up-down direction Z is positioned in the first through-hole H1 of the first main portion 1141.

Because the cross-sectional area of the first protruding portion 1121 is larger than the cross-sectional area of the first terminal hole 1111, the first protruding portion 1121 can be clamped above the first terminal hole 1111, thereby avoiding the first protruding portion 1121 of the first electrode terminal 112 passing through the first terminal hole 1111. At the same time, the first protruding portion 1121 can be in the shape of flat plate, and the first main portion 1141 of the first sealing member 114 is interposed between the first protruding portion 1121 and the cap plate 111 in the up-down direction Z, so that the first terminal hole 1111 is sealed from above. A top surface of the first protruding portion 1121 can be a plane, the first connecting piece 2 is welded with the top surface of the first protruding portion 1121.

When the first electrode terminal 112 of the battery cap assembly 11 needs to be connected with the first connecting piece 2, the first protruding portion 1121 can be directly fixed to the first connecting piece 2 by laser penetration welding. The projection of the welding portion M in the up-down direction Z formed in the process of welding is positioned in the first through-hole H1 of the first main portion 1141, heat generated in the process of welding is firstly transferred to a part of the first protruding portion 1121 positioned above the first main portion 1141 and then transferred to the first main portion 1141 downwardly, rather than directly transferred to the first main portion 1141 downwardly, therefore, the battery cap assembly 11 of the present disclosure can increase heat transfer path in the process of welding, decrease the heat transferred to first main portion 1141, reduce risk that the first main portion 1141 of the first sealing member 114 is damaged by high temperature, improve sealing performance and safety performance of the battery cap assembly 11.

Figure 3:
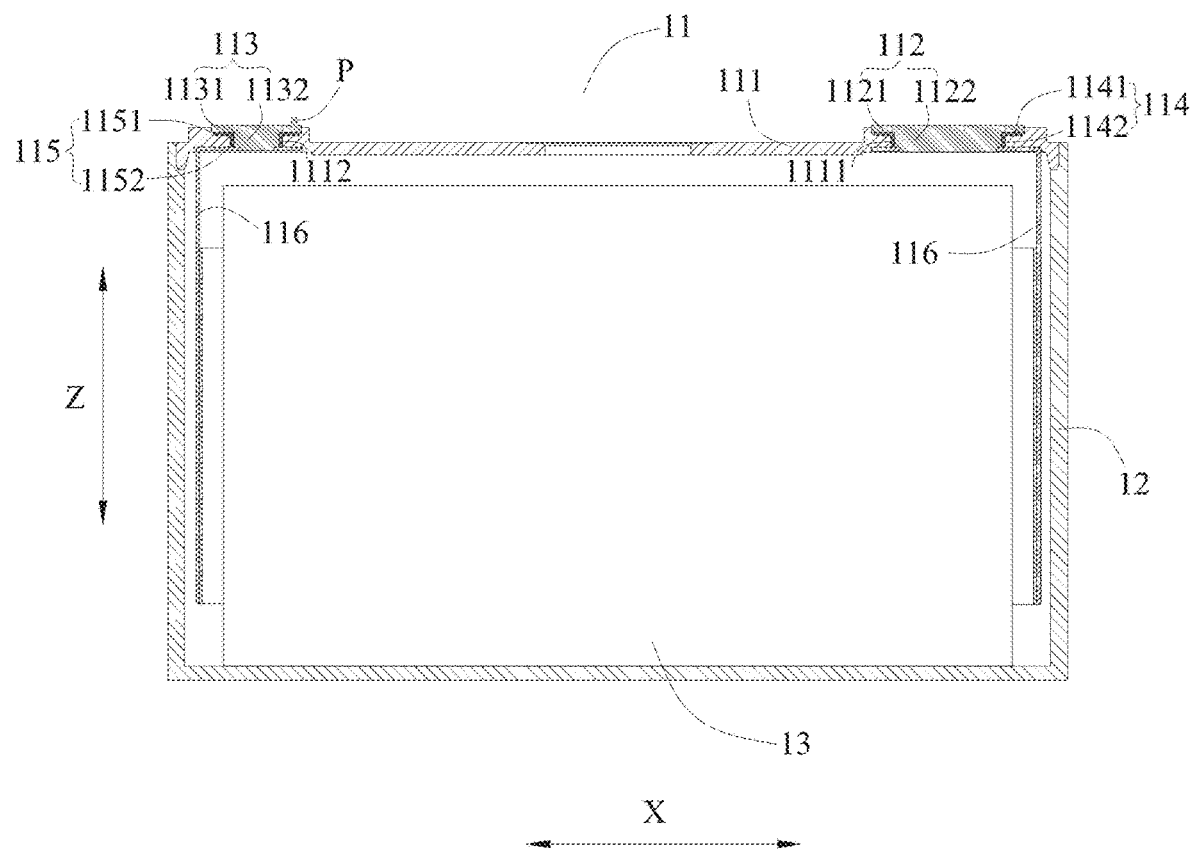
FIG. 3 is a cross sectional view of the secondary battery of FIG. 2.
Figure 13:
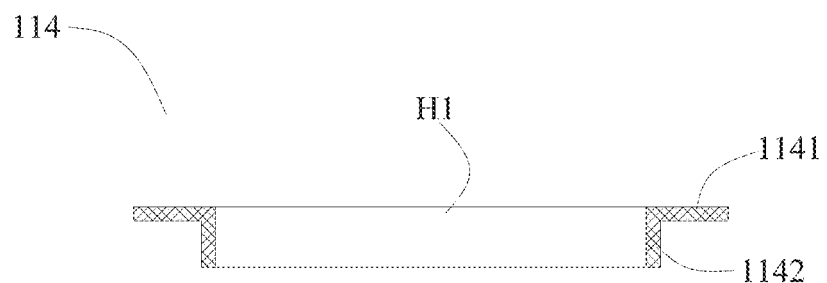
FIG. 13 is a schematic view of a first sealing member of a battery cap assembly according to the present disclosure.

Referring to FIG. 3, the first sealing member 114 further includes a first extending portion 1142, the first extending portion 1142 extends downwardly from a bottom surface of the first main portion 1141, extends into the first terminal hole 1111 and is interposed between the first base portion 1122 and a wall of first terminal hole 1111. Referring to FIG. 13, the first through-hole H1 of the first main portion 1141 passes through the first extending portion 1142. The first extending portion 1142 helps position the first sealing member 114 in the process of assembling.

Figure 5:
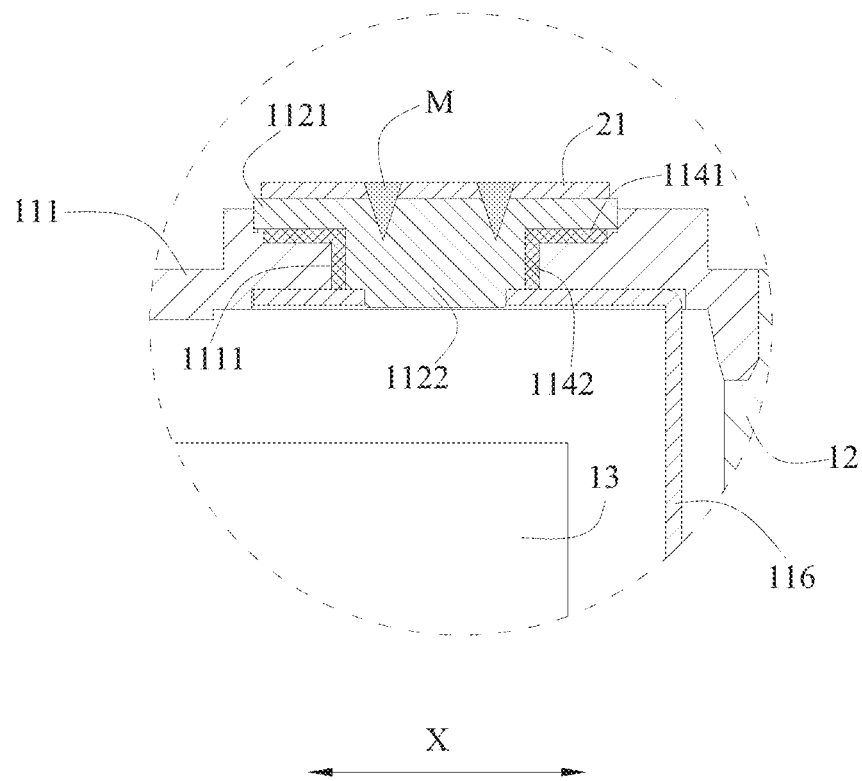
FIG. 5 is a schematic view of the first connecting piece and a first electrode terminal after welded.

Referring to FIG. 5, the projection of the welding portion M in the up-down direction Z is preferably positioned in a cross-section of the first base portion 1122. The first base portion 1122 needs to extend into the first terminal hole 1111, so the first base portion 1122 has a larger thickness relative to the first protruding portion 1121; in the process of welding, the welding portion M may extend to the first base portion 1122, thereby ensuring welding depth of the laser penetration welding and connecting strength between the first electrode terminal 112 and the first connecting piece 2. At the same time, the projection of the welding portion M in the up-down direction Z is positioned in the cross-section of the first base portion 1122, so a thickness of the first protruding portion 1121 protruding above the cap plate 111 can be decreased, thereby reducing an entire height of the battery cap assembly 11; in addition, the first base portion 1122 can further increase heat dissipating area in the process of welding, thereby enhancing heat dissipating speed, reducing risk that the first main portion 1141 of the first sealing member 114 is damaged by high temperature, improving the sealing performance and the safety performance of the battery cap assembly 11, a later mentioned secondary battery and a later mentioned battery module. In addition, the first terminal hole 1111 is sealed by the first main portion 1141 of the first sealing member 114, therefore, even if the heat in the first base portion 1122 is transferred to the first extending portion 1142, it will not affect the sealing performance.

Referring to FIG. 1 and FIG. 5, the projection of the welding portion M in the up-down direction Z at least includes a circular arc, preferably, the welding portion M is in the shape of annulus. The electrical current can flow between the first electrode terminal 112 and the first connecting piece 2 via the welding portion M. When a width of the welding portion M formed by welding is constant, an overcurrent area of the welding portion M depends on an extending length of the welding portion M. If the overcurrent area is constant, compared to the welding portion M in the shape of straight line, the welding portion M in the shape of circular arc can take advantage of length space and width space of the first electrode terminal 112 at the same time, which can lower the requirement of length and width of the electrode terminal 112.

Referring to FIG. 3, the battery cap assembly 11 further comprises a second electrode terminal 113 and a second sealing member 115, the cap plate 111 further includes a second terminal hole 1112. The second electrode terminal 113 includes a second protruding portion 1131 protruding above the cap plate 111 and a second base portion 1132 connected with a bottom surface of the second protruding portion 1131; the second base portion 1132 extends downwardly and extends into the second terminal hole 1112, a cross-sectional area of the second protruding portion 1131 is larger than a cross-sectional area of the second terminal hole 1112. The second sealing member 115 includes a second main portion 1151 provided between the second protruding portion 1131 and the cap plate 111, the second main portion 1151 includes a second through-hole H2 through which the second base portion 1132 passes.

Because the cross-sectional area of the second protruding portion 1131 is larger than the cross-sectional area of the second terminal hole 1112, the second protruding portion 1131 can be clamped above the second terminal hole 1112, thereby avoiding the second protruding portion 1131 of the second electrode terminal 113 passing through the second terminal hole 1112. At the same time, the second main portion 1151 of the second sealing member 115 is interposed between the second protruding portion 1131 and the cap plate 111 in the up-down direction Z, so that the second terminal hole 1112 can be sealed from above.

The second electrode terminal 113 is used for connecting with a second connecting piece 3.

Figure 11:
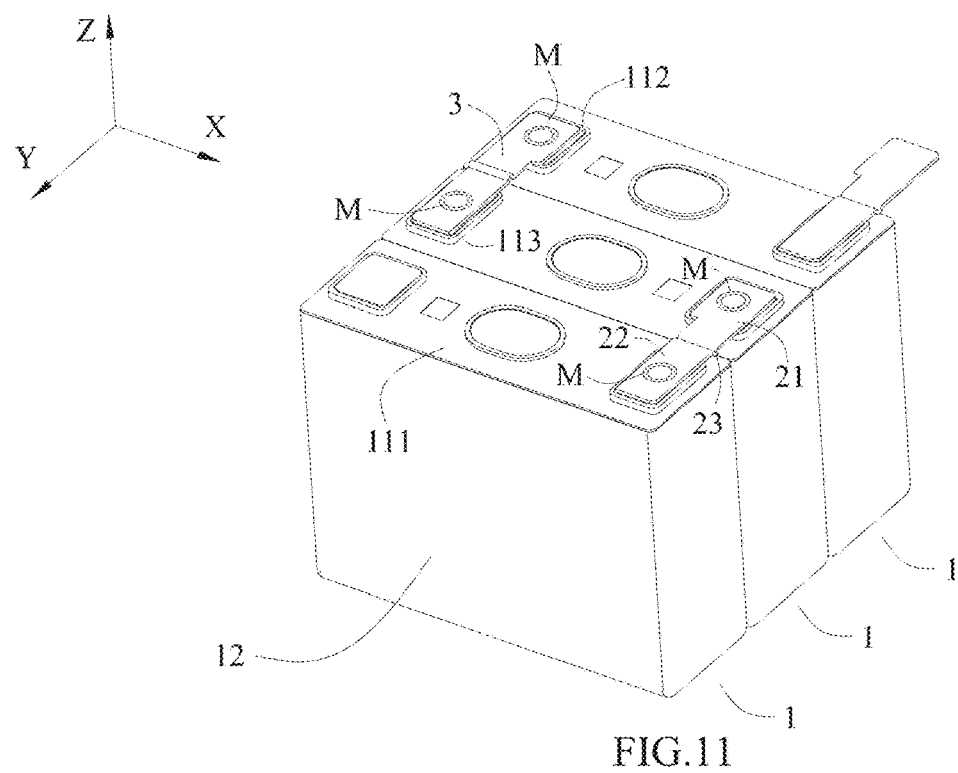
FIG. 11 is a schematic view of further another embodiment of the battery module according to the present disclosure.
Figure 12:
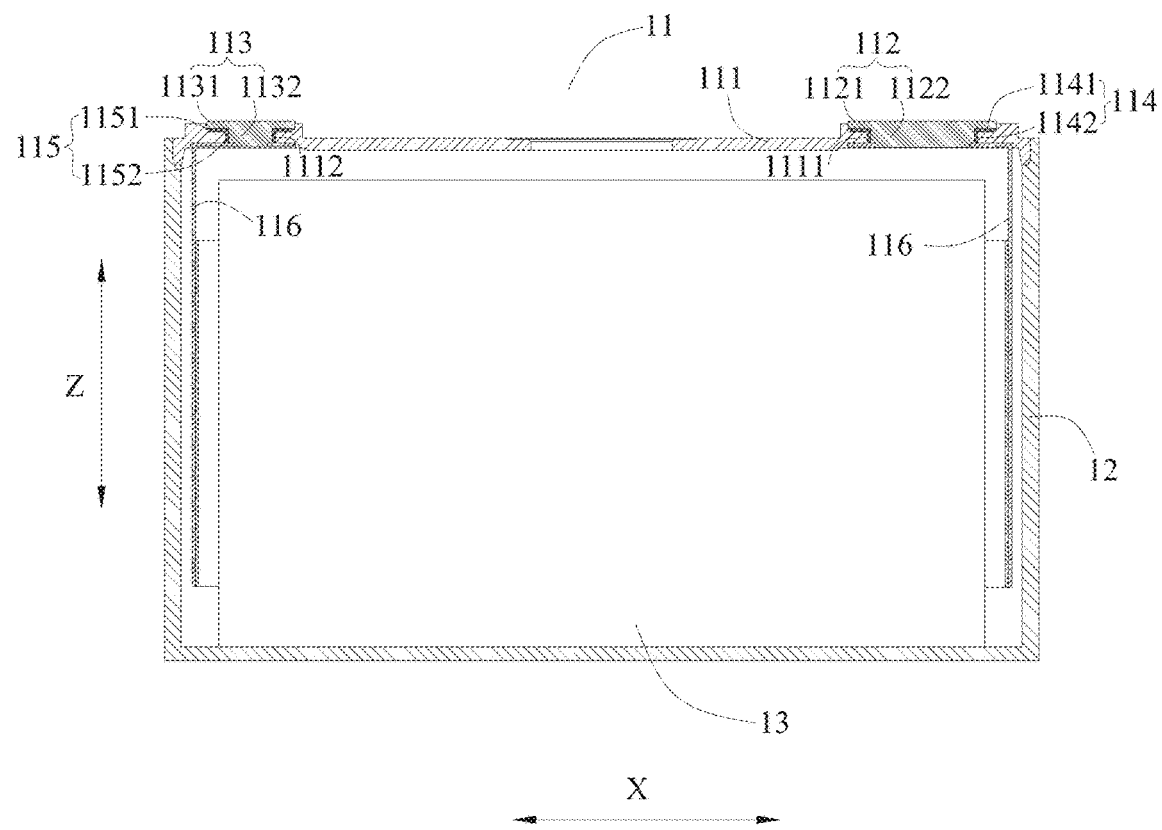
FIG. 12 is a cross sectional view of the secondary battery shown in FIG. 11.

Specifically, in an embodiment, referring to FIG. 11 and FIG. 12, an upper surface S of the second protruding portion 1131 is a plane. When the second electrode terminal 113 of the battery cap assembly 11 needs to be connected with the second connecting piece 3, the second connecting piece 3 can be directly fixed to the second protruding portion 1131 by laser penetration welding. A welding portion M is formed by welding the second protruding portion 1131 of the second electrode terminal 113 and the second connecting piece 3, and a projection of the welding portion M in the up-down direction Z is positioned in the second through-hole H2 of the second main portion 1151, preferably positioned in a cross-section of the second base portion 1132. The battery cap assembly 11 of the embodiment can increase heat transfer path in the process of welding, decrease heat transferred to the second main portion 1151, reduce risk that the second main portion 1151 of the second sealing member 115 is damaged by high temperature, and improve the sealing performance and the safety performance of the battery cap assembly 11.

Figure 14:
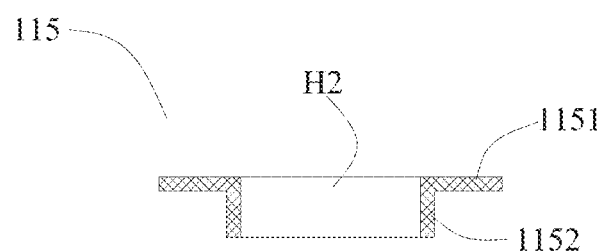
FIG. 14 is a schematic view of a second sealing member of the battery cap assembly according to the present disclosure.

Referring to FIG. 3, the second sealing member 115 further includes a second extending portion 1152, the second extending portion 1152 extends downwardly from a bottom surface of the second main portion 1151, extends into the second terminal hole 1112 and is interposed between the second base portion 1132 and a wall of the second terminal hole 1112. Referring to FIG. 14, the second through-hole H2 of the second main portion 1151 passes through the second extending portion 1152. The second extending portion 1152 helps position the second sealing member 115 in the process of assembling.

In another embodiment, referring to FIGS. 1-4, a protrusion P is formed on the upper surface S of the second protruding portion 1131 and used for welding with the second connecting piece 3. Because the protrusion P is provided on the upper surface S of the second protruding portion 1131, when the second electrode terminal 113 of the battery cap assembly 11 needs to be connected with the second connecting piece 3, the protrusion P can be directly fixed to the second connecting piece 3 by butt welding; compared to the traditional laser penetration welding, the butt welding can effectively decrease the heat generated in the process of welding and avoid the second sealing member 115 being damaged by high temperature.

The first connecting piece 2 can further be used for connecting the first electrode terminal 112 of a first one of the battery cap assemblies 11 and the second electrode terminal 113 of a second one of the battery cap assemblies 11, so as to electrically connect the two battery cap assemblies 11. Similarly, the second connecting piece 3 can further be used for connecting the second electrode terminal 113 of the first one of the battery cap assemblies 11 and the first electrode terminal 112 of a third one of the battery cap assemblies 11, so as to electrically connect the two battery cap assemblies 11. The first connecting piece 2 and the second connecting piece 3 are the same.

For example, when one first connecting piece 2 needs to connect the first electrode terminal 112 of the first one of the battery cap assemblies 11 and the second electrode terminal 113 of the second one of the battery cap assemblies 11, the first connecting piece 2 can be connected with the first protruding portion 1121 of the first electrode terminal 112 by laser penetration welding, and the welding position is flexible, so it only needs to ensure that the first connecting piece 2 is fitted with the protrusion P of the second one of the battery cap assemblies 11 in the process of assembling the first connecting piece 2; even if there is a dimension tolerance between the two battery cap assemblies 11, the first electrode terminal 112 of the first one of the battery cap assemblies 11 will not limit the positioning and assembling of the first connecting piece 2, which can ensure the connecting strength between the first connecting piece 2 and the two battery cap assemblies 11.

Shape of the protrusion P depends on actual demand, for example, the protrusion P is in the shape of stripe. Specifically, in an embodiment, referring to FIG. 8, a cross-section of the protrusion P is a rectangle and the protrusion P extends along a transverse direction X of the cap plate 111, a width of the protrusion P in a longitudinal direction Y ranges from 0.5 mm to 3 mm. In another embodiment, referring to FIG.

10, the cross-section of the protrusion P is a rectangle and the protrusion P extends along the longitudinal direction Y, a width of the protrusion P in the transverse direction X ranges from 0.5 mm to 3 mm.

The protrusion P also can be provided on different positions of the upper surface S, for example, the protrusion P can be positioned in a middle part of the upper surface S or at an edge of the upper surface S.

In the up-down direction Z, both of a thickness of the first protruding portion 1121 and a thickness of the second protruding portion 1131 range from 0.01 mm to 2 mm, preferably, the thickness of the first protruding portion 1121 is equal to the thickness of the second protruding portion 1131. The protrusion P is provided on the second protruding portion 1131, and there is no need to weld the second protruding portion 1131 and the second connecting piece 3, so the second protruding portion 1131 can have a small thickness. Because the projection of the welding portion M formed by welding the first protruding portion 1121 and the first connecting piece 2 in the up-down direction Z is positioned in the cross-section of the first base portion 1122, the first protruding portion 1121 can have a small thickness.

The first electrode terminal 112 can be a positive electrode terminal and made of aluminum, the second electrode terminal 113 can be a negative electrode terminal and made of copper, and a cross-sectional area of the second base portion 1132 is smaller than a cross-sectional area of the first base portion 1122.

The battery cap assembly 11 of the present disclosure is generally applied to the later mentioned secondary battery 1, the first electrode terminal 112 (positive electrode terminal) and the second electrode terminal 113 (negative electrode terminal) can transfer the electric energy of the secondary battery 1 to outside via a positive electrode plate (a later mentioned first electrode plate) and a negative electrode plate (a later mentioned second electrode plate) respectively. Considering electrochemistry, a current collector of the positive electrode plate is formed by aluminum foil, and a current collector of the negative electrode plate is formed by copper foil. It is difficult to connect aluminum and copper by laser welding, so in order to ensure the connecting strength between the first electrode terminal 112 and the positive electrode plate and the connecting strength between second electrode terminal 113 and the negative electrode plate, the first electrode terminal 112 is preferably made of aluminum, the second electrode terminal 113 is preferably made of copper.

Because the protrusion P is provided on the upper surface S of the second electrode terminal 113, when the second electrode terminal 113 of the battery cap assembly 11 needs to be connected with second connecting piece 3, the protrusion P can be directly fixed to the second connecting piece 3 by butt welding; compared to the traditional laser penetration welding, the butt welding can effectively decrease the heat generated in the process of welding and avoid the second sealing member 115 being damaged by high temperature. In addition, compared to aluminum, copper needs more energy and generates more heat in the process of welding, so the second electrode terminal 113 made of copper needs to choose the butt welding generating few heat. In addition, because electrical resistance of copper is lower than electrical resistance of aluminum, based on the premise that the overcurrent ability of the first electrode terminal 112 and the overcurrent ability of the second electrode terminal 113 are consistent, the cross-sectional area of the second base portion 1132 can be decreased, which can reduce weight of the secondary battery 1 and improve energy density. At the same time, the price of copper is higher than the price of aluminum, so it can save amount of copper and reduce cost.

The cap plate 111 can be made of insulating material. The battery cap assembly 11 further comprises two adapter pieces 116, one adapter piece 116 is attached to a bottom surface of the cap plate 111 and welded with the first base portion 1122, the other adapter piece 116 is attached to the bottom surface of the cap plate 11 and welded with the second base portion 1132. Because the cap plate 111 is made of the insulating material, the two adapter pieces 116 can be directly attached to the bottom surface of the cap plate 111, and there is no need to provide an insulating member between the cap plate 111 and the adapter piece 116, which can save space.

In addition, a cross-section of the first protruding portion 1121, the cross-section of the first base portion 1122, a cross-section of the second protruding portion 1131, the cross-section of the second base portion 1132, a cross-section of the first terminal hole 1111 and a cross-section of the second terminal hole 1112 are sections perpendicular to the up-down direction Z, and the cross-sectional area is area of the section perpendicular to the up-down direction Z.

Secondly, a secondary battery according to a second aspect of the present disclosure will be described.

Referring to FIGS. 1-14, a secondary battery 1 according to the present disclosure comprises a case 12, the battery cap assembly 11 according to the first aspect of the present disclosure and an electrode assembly 13. The case 12 has an opening in a top thereof. The cap plate 111 of the battery cap assembly 11 is fixed to the case 12 and seals the opening of the case 12. The electrode assembly 13 is received in the case 12 and electrically connected with the first electrode terminal 112.

Figure 2:
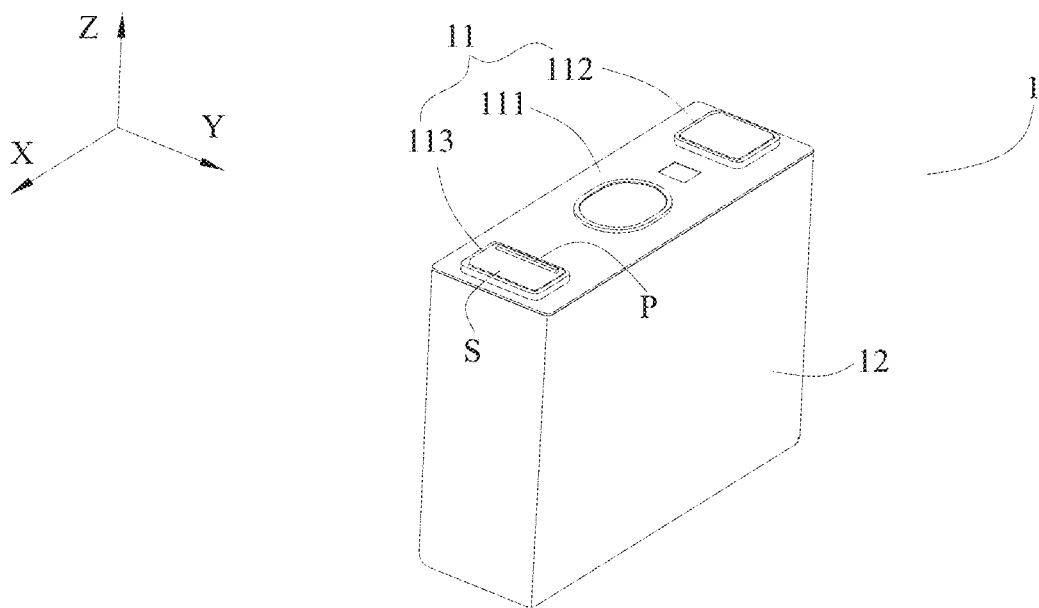
FIG. 2 is a schematic view of a secondary battery shown in FIG. 1.

Referring to FIG. 2, the secondary battery 1 can be a prismatic rechargeable battery; certainly, the secondary battery 1 also can have other shapes. Correspondingly, the case 12 can have a hexahedral shape, a cavity is formed in the case 12, and the electrode assembly 13 can be assembled into the case 12 via the opening of the case 12.

One opening is provided in the top of the case 12, the battery cap assembly 11 of the secondary battery 1 of the present disclosure only comprises one cap plate 111; the first electrode terminal 112, the second electrode terminal 113, the first sealing member 114 and the second sealing member 115 are provided to the one cap plate 111. Alternatively, two openings are respectively provided in the top of the case 12 and the bottom of the case 12, the battery cap assembly 11 of the secondary battery 1 of the present disclosure comprises two cap plates 111; one cap plate 111 seals the opening in the top of the case 12, and the first electrode terminal 112 and the first sealing member 114 are provided to the one cap plate 111; the other cap plate 111 seals the opening in the bottom of the case 12, and the second electrode terminal 113 and the second sealing member 115 are provided to the other cap plate 111.

The electrode assembly 13 can comprise a first electrode plate, a second electrode plate and a separator separating the first electrode plate and the second electrode plate. The first electrode plate and the second electrode plate are opposite in polarity. Each of the first electrode plate and the second electrode plate comprises the current collector and an active material coated on the surface of the current collector, the current collector can be metal foil. The first electrode plate of the electrode assembly 13 can be electrically connected with the first electrode terminal 112 via one adapter piece 116, the second electrode plate of the electrode assembly 13 can be electrically connected with the second electrode terminal 113 via the other adapter piece 116.

The first electrode terminal 112 extends into the case 12 via the first terminal hole 1111, and is electrically connected with the electrode assembly 13 in the case 12; the second electrode terminal 113 extends into the case 12 via the second terminal hole 1112, and is electrically connected with the electrode assembly 13 in the case 12.

Preferably, the first electrode plate is the positive electrode plate, and the current collector of the first electrode plate is made of aluminum in general; correspondingly, the second electrode plate is the negative electrode plate, and the current collector of the second electrode plate is made of copper in general. Because it is difficult to welding different metals, especially copper and aluminum, first electrode terminal 112 is preferably made of aluminum and the second electrode terminal 113 is preferably made of copper.

Finally, a battery module according to a third aspect of the present disclosure will be described.

Referring to FIGS. 1-14, a battery module of the present disclosure comprises the first connecting piece 2 and the secondary batteries 1 according to the second aspect of the present disclosure, the first connecting piece 2 is welded with the first protruding portion 1121 of the first electrode terminal 112 of the battery cap assembly 11 of the secondary battery 1 to form the welding portion M, the projection of the welding portion M in the up-down direction Z is positioned in the first through-hole H1 of the first main portion 1141.

The secondary batteries 1 are arranged in a row, two adjacent secondary batteries 1 can be electrically connected by one connecting piece (such as the first connecting piece 2). For example, when the two adjacent secondary batteries 1 need to be connected in series, the first connecting piece 2 connects the first electrode terminal 112 of one secondary battery 1 and the second electrode terminal 113 of the other secondary battery 1; when the two adjacent secondary batteries 1 need to be connected in parallel, the first connecting piece 2 connects the first electrode terminals 112 of the two adjacent secondary batteries 1 or the second electrode terminals 11 of the two adjacent secondary batteries 1.

Hereinafter the battery module comprising the secondary batteries 1 connected in series will be described.

Figure 6:
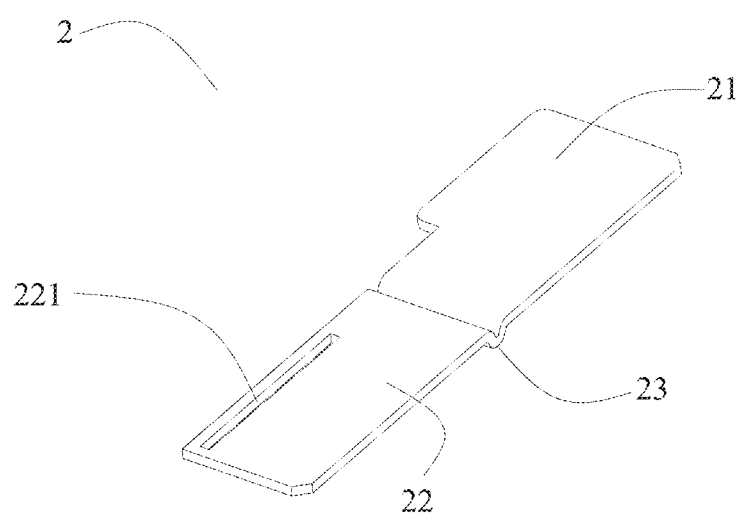
FIG. 6 is a schematic view of the first connecting piece of the battery module according to the present disclosure.
Figure 7:
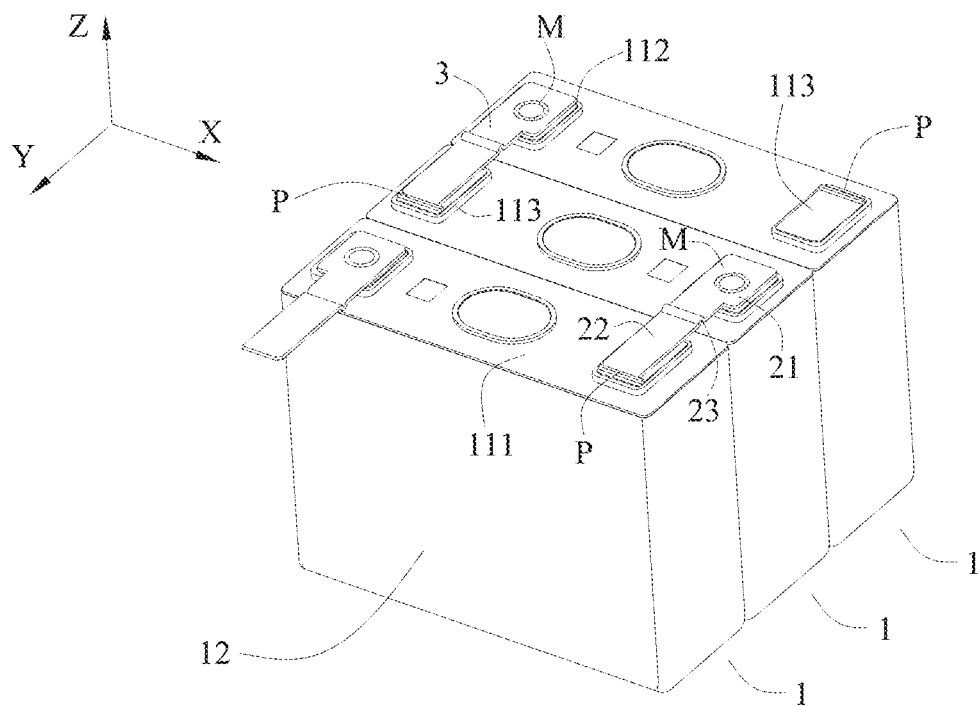
FIG. 7 is a schematic view of another embodiment of the battery module according to the present disclosure.
Figure 8:
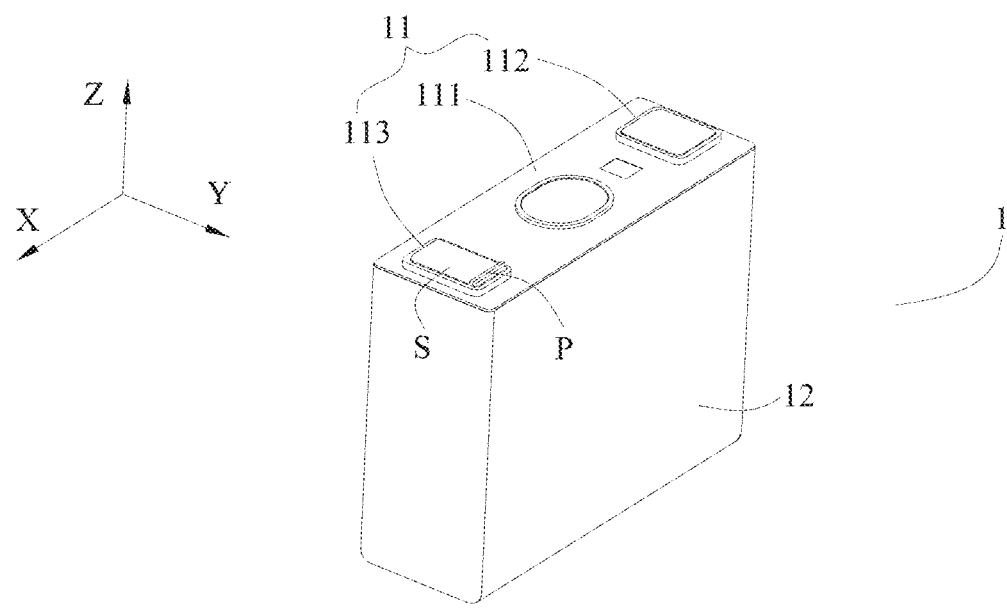
FIG. 8 is a schematic view of the secondary battery shown in FIG. 7.
Figure 9:
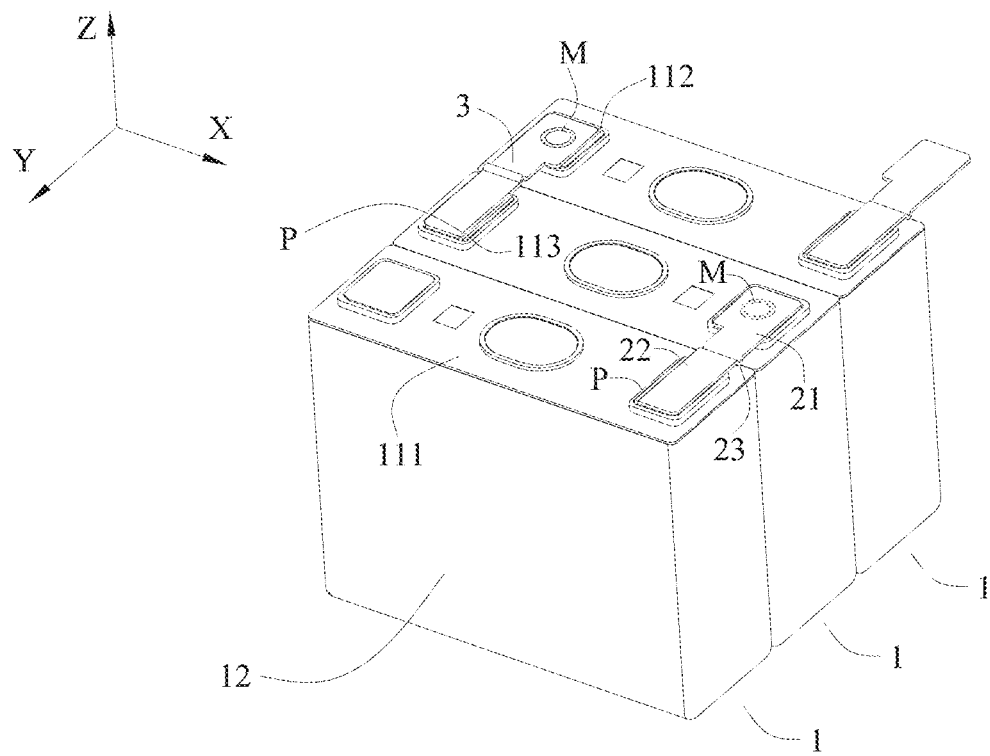
FIG. 9 is a schematic view of still another embodiment of the battery module according to the present disclosure.
Figure 10:
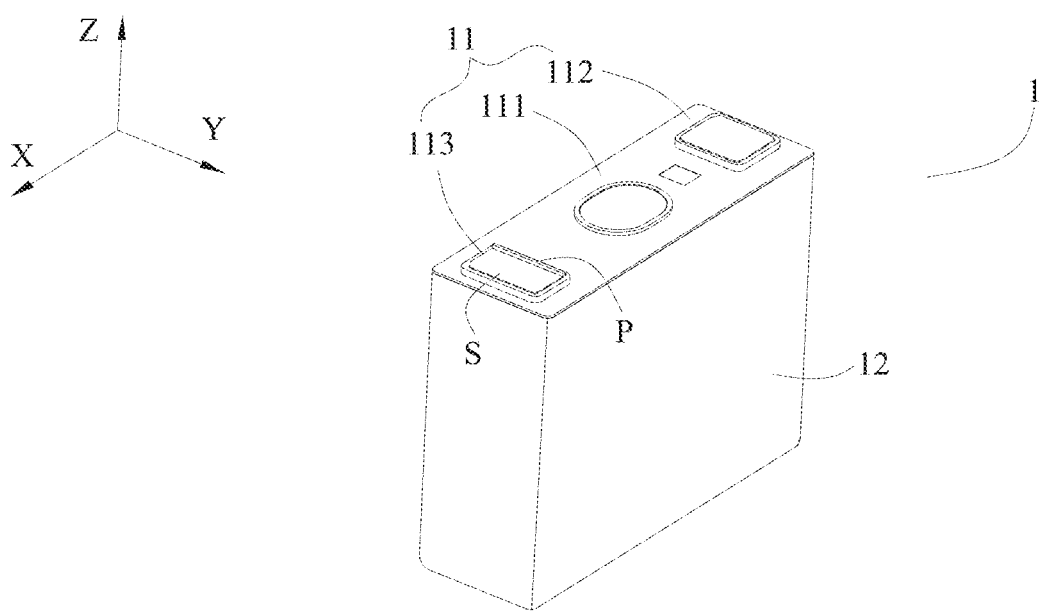
FIG. 10 is a schematic view of the secondary battery shown in FIG. 9.

Referring to FIG. 1 and FIG. 6, the first connecting piece 2 includes a first connecting portion 21 and a second connecting portion 22; the first connecting portion 21 is welded with the first protruding portion 1121 of the first electrode terminal 112 of the battery cap assembly 11 of one secondary battery 1, the second connecting portion 22 is welded with the protrusion P of the second protruding portion 1131 of the second electrode terminal 113 of the battery cap assembly 11 of another secondary battery 1 (certainly, the protrusion P can be omitted and the second connecting portion 22 can be directly welded with the upper surface S of the protruding portion 1131).

Figure 4:
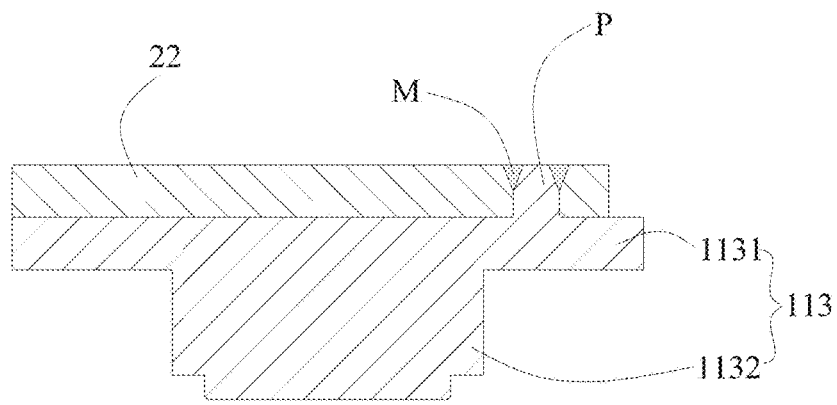
FIG. 4 is a schematic view of a first connecting piece and a second electrode terminal after welded.

The process of assembling the battery module is as follows: firstly, arranging the secondary batteries 1 in a row; secondly, attaching the first connecting portion 21 of the first connecting piece 2 to the top surface of the first protruding portion 1121 of the first electrode terminal 112 of the battery cap assembly 11 of one secondary battery 1, and attaching the second connecting portion 22 to the upper surface S and the protrusion P of the second protruding portion 1131 of the second electrode terminal 113 of the battery cap assembly 11 of another secondary battery 1; thirdly, referring to FIG. 4, welding along a contacting boundary between the second connecting portion 22 and the protrusion P, thereby fixing the first connecting piece 2 to the another secondary battery 1; referring to FIG. 5, connecting the first connecting portion 21 with the first protruding portion 1121 of the first electrode terminal 112 of the battery cap assembly 11 of the one secondary battery 1 directly by laser penetration welding; finally, repeating aforementioned steps, and circularly welding a plurality of connecting pieces (such as the second connecting piece 3, a third connecting piece and the like) to connect all the secondary batteries 1.

In the process of assembling the battery module according to the present disclosure, the welding portion M is formed by welding the first protruding portion 1121 of the first electrode terminal 112 of the battery cap assembly 11 of the secondary battery 1 and the first connecting piece 2, and the projection of the welding portion M in the up-down direction Z is positioned in the first through-hole H1 of the first main portion 1141 of the first sealing member 114. The heat generated in the process of welding is firstly transferred to the part of the first protruding portion 1121 positioned above the first main portion 1141 and then transferred downwardly to the first main portion 1141, rather than directly transferred downwardly to the first main portion 1141, therefore, the battery module of the present disclosure can increase heat transfer path in the process of welding, decrease the heat transferred to first main portion 1141, reduce risk that the first main portion 1141 of the first sealing member 114 is damaged by high temperature, improve the sealing performance and the safety performance of the battery cap assembly 11, the secondary battery 1 and the battery module.

Referring to FIG. 1 and FIG. 6, the first connecting piece 2 further includes a third connecting portion 23 in the shape of arch, the third connecting portion 23 connects the first connecting portion 21 and the second connecting portion 22. The third connecting portion 23 in the shape of arch can adjust a height difference between the first connecting portion 21 and the second connecting portion 22 in the up-down direction Z.

Referring to FIG. 1 and FIG. 6, the second connecting portion 22 includes a third through-hole 221 fitted with the protrusion P of the secondary battery 1, the protrusion P of the secondary battery 1 can be fixed to the third through-hole 221 by laser welding. By providing the third through-hole 221, it can increase a length of welding seam between the second connecting portion 22 and the protrusion P and improve welding strength.

In addition, in the battery module according to the present disclosure, the protrusion P and the second connecting portion 22 of the first connecting piece 2 are arranged side by side, so the protrusion P will not increase the height of the battery module; at the same time, the second connecting portion 22 of the first connecting piece 2 is fixed to the protrusion P by butt welding, and there is no need to fix the second connecting portion 22 of the first connecting piece 2 to the upper surface S of the second electrode terminal 113 by laser penetration welding, which can lower the requirement of a thickness of the second electrode terminal 113, decrease the thickness of the second electrode terminal 113 and save material, reduce the total height of the second electrode terminal 113 and the first connecting piece 2 assembled together, improve the energy density of the battery module. In addition, the first protruding portion 1121 of the first electrode terminal 112 is directly connected with the first connecting portion 21 by laser penetration welding, therefore, it only needs to ensure that the second connecting portion 22 of the first connecting piece 2 is fitted with the protrusion P in the process of assembling the first connecting piece 2; even if the dimension tolerances of the secondary batteries 1 accumulate, the first protruding portion 1121 of the first electrode terminal 112 will not limit the positioning and assembling of the first connecting piece 2, which can ensure the connecting strength between the first connecting piece 2 and two secondary batteries 1, and increase cycle life.

Preferably, the first electrode terminal 112 is made of aluminum, the second electrode terminal 113 is made of copper, and the cross-sectional area of the second base portion 1132 is smaller than the cross-sectional area of the first base portion 1122.

The protrusion P is provided on the upper surface S of the second electrode terminal 113 and fixed to the second connecting portion 22 of the first connecting piece 2 by butt welding; compared to the traditional laser penetration welding, the butt welding can effectively decrease the heat generated in the process of welding and avoid the second sealing member 115 between the second electrode terminal 113 and the cap plate 111 being damaged by high temperature. In addition, compared to aluminum, copper needs more energy and generates more heat in the process of welding, so the second electrode terminal 113 made of copper needs to choose the butt welding generating few heat. In addition, because the electrical resistance of copper is lower than the electrical resistance of aluminum, based on the premise that the overcurrent ability of the first electrode terminal 112 and the overcurrent ability of the second electrode terminal 113 are consistent, the cross-sectional area of the second base portion 1132 of the second electrode terminal 113 can be decreased, which can reduce weight of the secondary battery 1 and improve energy density. At the same time, the price of copper is higher than the price of aluminum, so it can save amount of copper and reduce cost.

What is claimed is:

1. A battery module, comprising a first connecting piece and secondary batteries;
   wherein
   each secondary battery comprises a case, a battery cap assembly and an electrode assembly;
   the case has an opening in a top thereof;
   the battery cap assembly is fixed to the case and seals the opening of the case;
   the electrode assembly is received in the case;
   the battery cap assembly comprises a cap plate, a first electrode terminal and a first sealing member;
   the cap plate includes a first terminal hole;
   the first electrode terminal includes a first protruding portion protruding above the cap plate and a first base portion connected with the first protruding portion, the first base portion extends into the first terminal hole, a cross-sectional area of the first protruding portion is larger than a cross-sectional area of the first terminal hole;
   the first sealing member includes a first main portion provided between the first protruding portion and the cap plate, the first main portion includes a first through-hole through which the first base portion passes;
   the first connecting piece is welded with the first protruding portion of the first electrode terminal of the battery cap assembly of the secondary battery to form a welding portion;
   the first base portion is connected with a bottom surface of the first protruding portion and extends downwardly; and
   the welding portion extends to the first base portion.

2. The battery module according to claim 1, wherein
   the battery cap assembly further comprises a second electrode terminal and a second sealing member, the cap plate further includes a second terminal hole;
   the second electrode terminal includes a second protruding portion protruding above the cap plate and a second base portion connected with a bottom surface of the second protruding portion; the second base portion extends downwardly and extends into the second terminal hole, a cross-sectional area of the second protruding portion is larger than a cross-sectional area of the second terminal hole;
   the second sealing member includes a second main portion provided between the second protruding portion and the cap plate, the second main portion includes a second through-hole through which the second base portion passes.

3. The battery module according to claim 2, wherein
   a protrusion is formed on an upper surface of the second protruding portion.

4. The battery module according to claim 2, wherein
   the first electrode terminal is a positive electrode terminal and made of aluminum, the second electrode terminal is a negative electrode terminal and made of copper, and a cross-sectional area of the second base portion is smaller than a cross-sectional area of the first base portion.

5. The battery module according to claim 3, wherein
   the secondary batteries comprise a first secondary battery and a second secondary battery; and
   the first connecting piece is welded with the first protruding portion of the first electrode terminal of the battery cap assembly of the first secondary battery and the protrusion of the second electrode terminal of the battery cap assembly of the second secondary battery.

6. The battery module according to claim 5, wherein
   the first connecting piece comprises a third through-hole, the protrusion is inserted into the third through-hole and welded with the first connecting piece.

7. The battery module according to claim 5, wherein
   in the up-down direction, both of a thickness of the first protruding portion and a thickness of the second protruding portion range from 0.01 mm to 2 mm.

8. The battery module according to claim 3, wherein
   a cross-section of the protrusion is a rectangle and the protrusion extends along a transverse direction of the cap plate; or
   a cross-section of the protrusion is a rectangle and the protrusion extends along a longitudinal direction.

9. The battery module according to claim 1, wherein
   the first sealing member further includes a first extending portion, the first extending portion extends downwardly from a bottom surface of the first main portion, extends into the first terminal hole and is interposed between the first base portion and a wall of first terminal hole.

10. The battery module according to claim 1, wherein the welding portion is in the shape of annulus.

11. The battery module according to claim 1, wherein
    the cap plate is made of insulating material;
    the battery cap assembly further comprises an adapter piece, the adapter piece is attached on a bottom surface of the cap plate, welded with the first base portion and connected with the electrode assembly.

* * * * *